United States Patent
Horstin

(10) Patent No.: US 7,117,839 B2
(45) Date of Patent: Oct. 10, 2006

(54) MULTI-STAGE MODULAR ROTARY INTERNAL COMBUSTION ENGINE

(75) Inventor: Abraham Hugo Horstin, Thousand Oaks, CA (US)

(73) Assignee: Abraham H. Horstin, Thousand Oaks, CA (US)

( * ) Notice: Subject to any disclaimer, the term of this patent is extended or adjusted under 35 U.S.C. 154(b) by 0 days.

(21) Appl. No.: 10/867,322

(22) Filed: Jun. 15, 2004

(65) Prior Publication Data

US 2005/0005898 A1    Jan. 13, 2005

(51) Int. Cl.
  F02B 53/00   (2006.01)
  F02B 53/04   (2006.01)
  F01C 20/00   (2006.01)
  F01C 1/00    (2006.01)
  F04C 18/00   (2006.01)
  F04C 2/00    (2006.01)

(52) U.S. Cl. ............... 123/204; 123/236; 418/159; 418/267

(58) Field of Classification Search ............ 123/204, 123/235–237; 418/259, 264–268
See application file for complete search history.

(56) References Cited

U.S. PATENT DOCUMENTS

| | | | | |
|---|---|---|---|---|
| 940,246 A | * | 11/1909 | Hagerty | 418/259 |
| 1,970,004 A | * | 8/1934 | Friedell | 123/210 |
| 2,248,639 A | * | 7/1941 | Miksits | 123/204 |
| 3,555,813 A | * | 1/1971 | Brancroft | 123/204 |
| 3,640,648 A | * | 2/1972 | Odawara | 123/204 |
| 3,724,427 A | * | 4/1973 | Sauder | 123/204 |
| 3,765,379 A | * | 10/1973 | Thomas | 418/267 |
| 3,937,605 A | * | 2/1976 | Karpisek | 123/221 |
| 3,989,011 A | * | 11/1976 | Takahashi | 123/204 |
| 3,996,899 A | * | 12/1976 | Partner et al. | 123/204 |
| 4,553,513 A | * | 11/1985 | Miles et al. | 123/204 |

* cited by examiner

Primary Examiner—Thai-Ba Trieu

(57) ABSTRACT

A three-stage internal combustion rotary engine, comprised of: a compressor feeding compressed air to a combustor for compression, fuel injection, combustion, and expansion of gases which rotate the rotor. The combustor rotor generates torque and drives the compressor and afterburner rotors simultaneously. The afterburner receives the combusted gases and scavenged air from the combustor for secondary combustion and expels the exhaust gases. Each unit consists of a housing joined together on a common axis and a rotor with a shaft mounted in an eccentric position of the housing side-walls. The shafts are interconnected by splines. The rotors have radial blind slots which contain slidable, movable vanes fitted with half-round knobs on opposite sides, aligned with the top surface and fit in the hemispherical grooves on the interior side-walls of the housing. This maintains a permanent contact with the interior housing periphery, regardless of gas pressures and rotating speed.

2 Claims, 12 Drawing Sheets

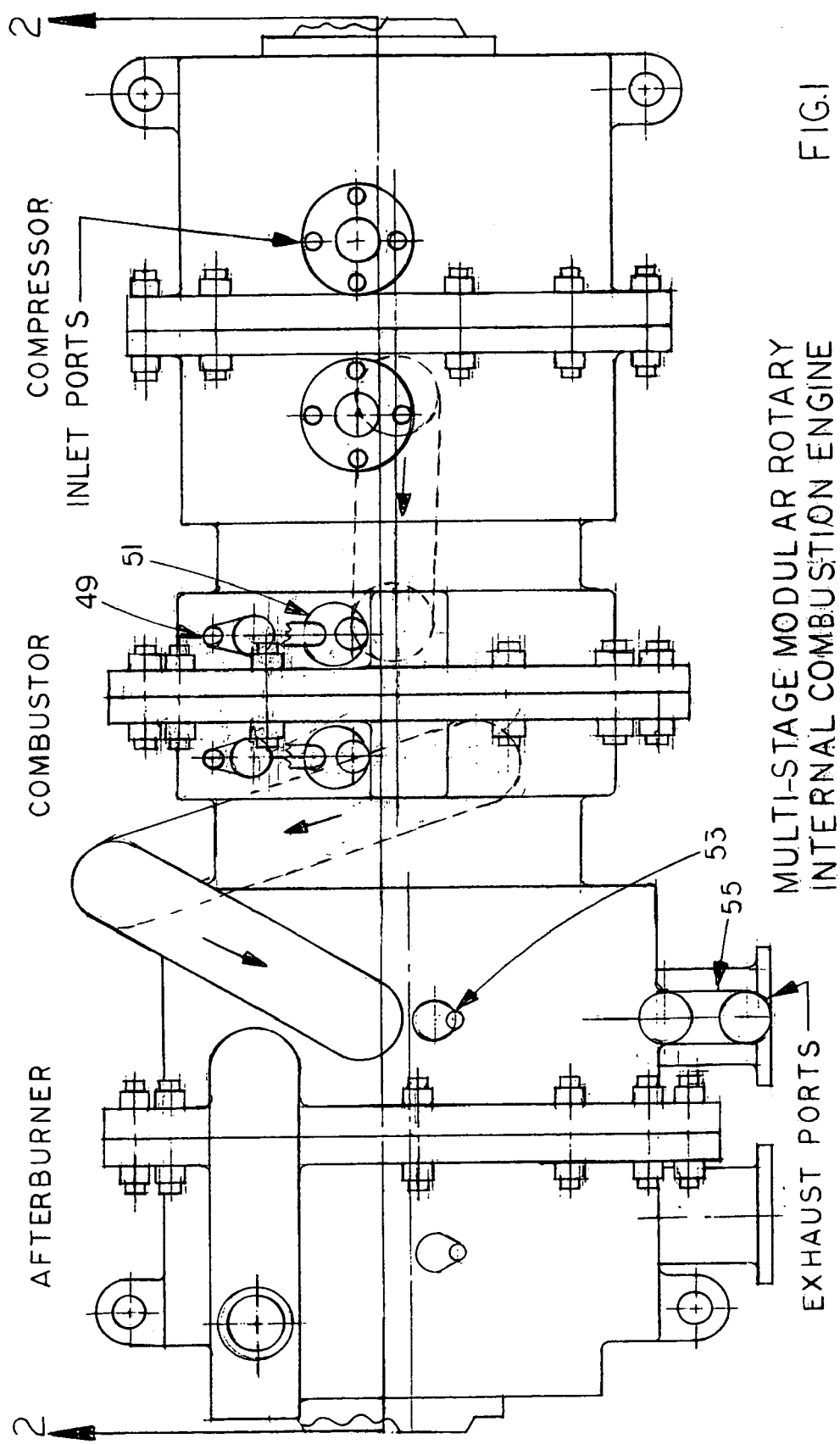

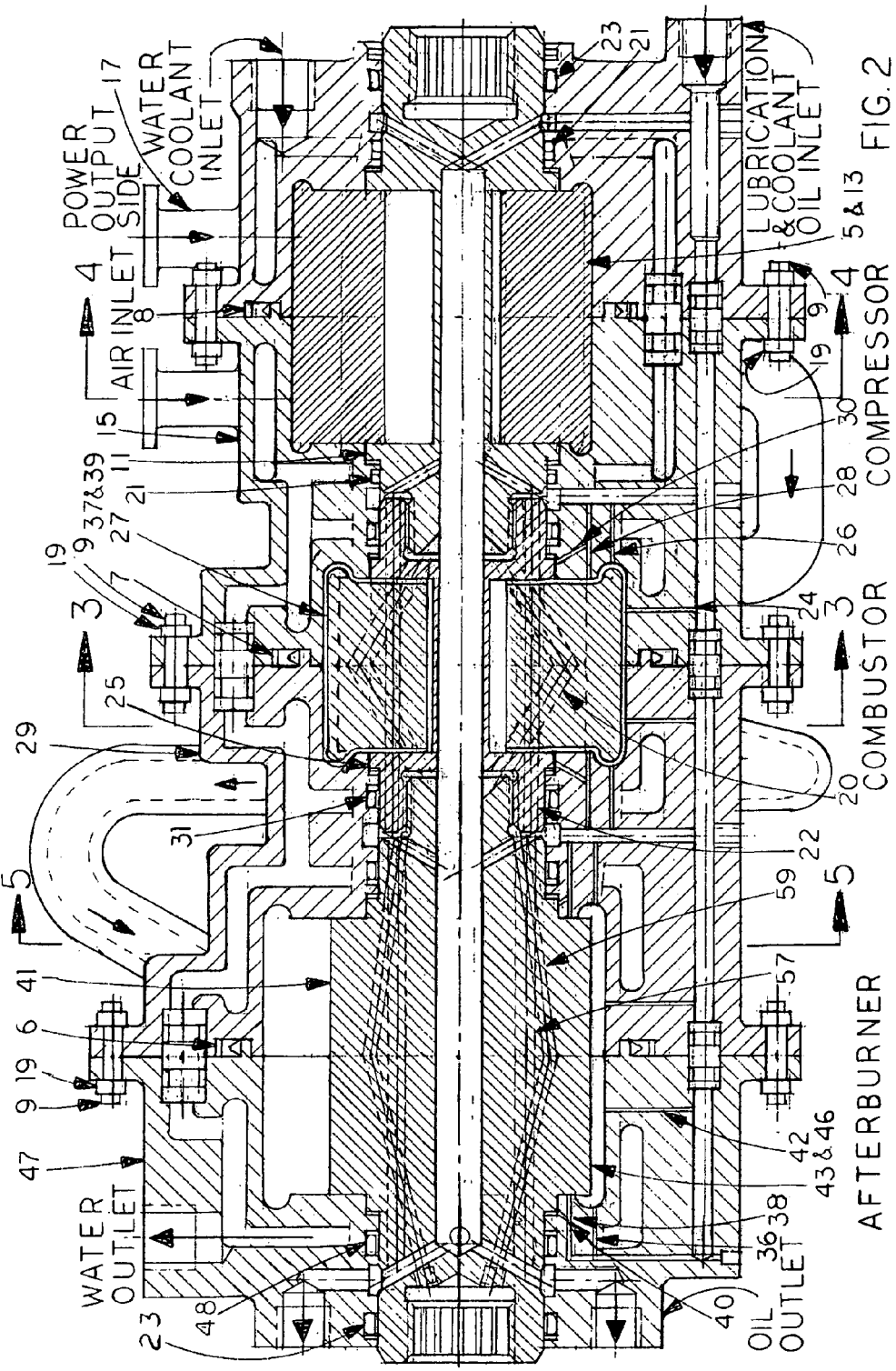

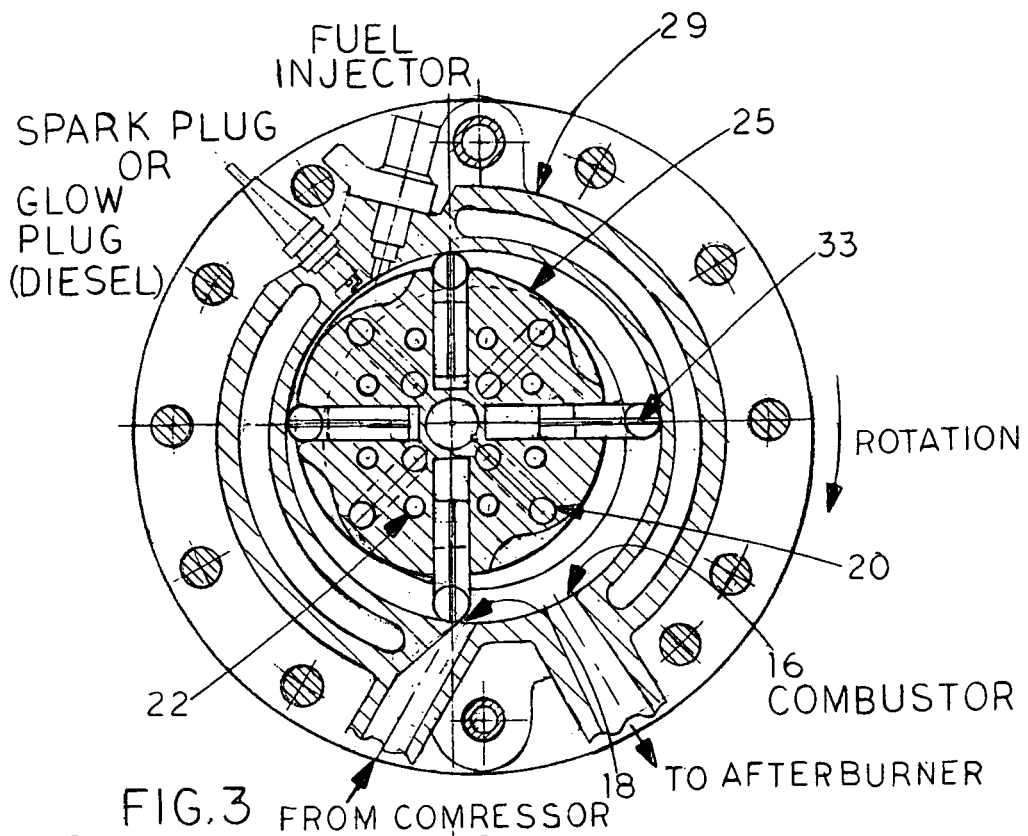

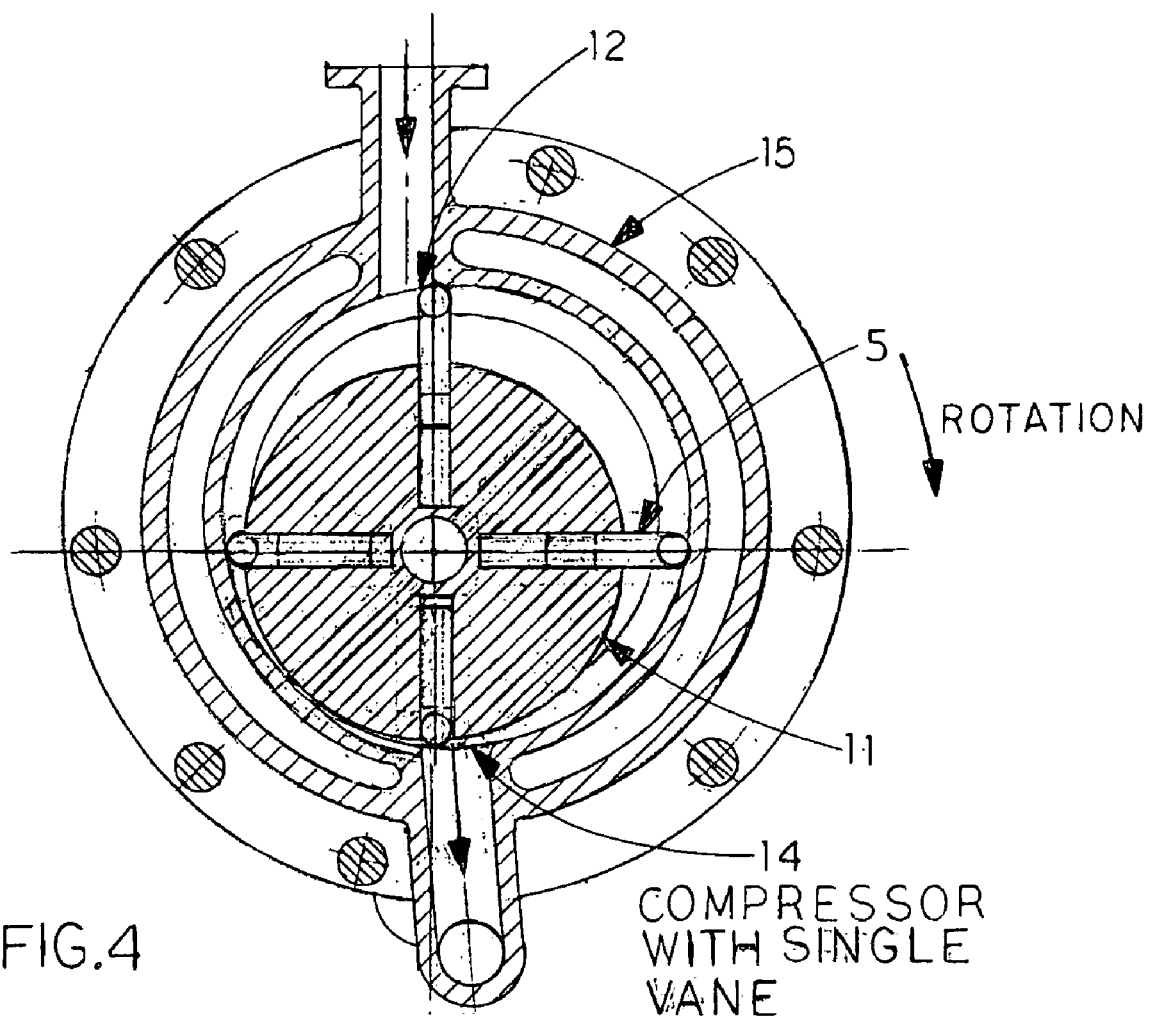

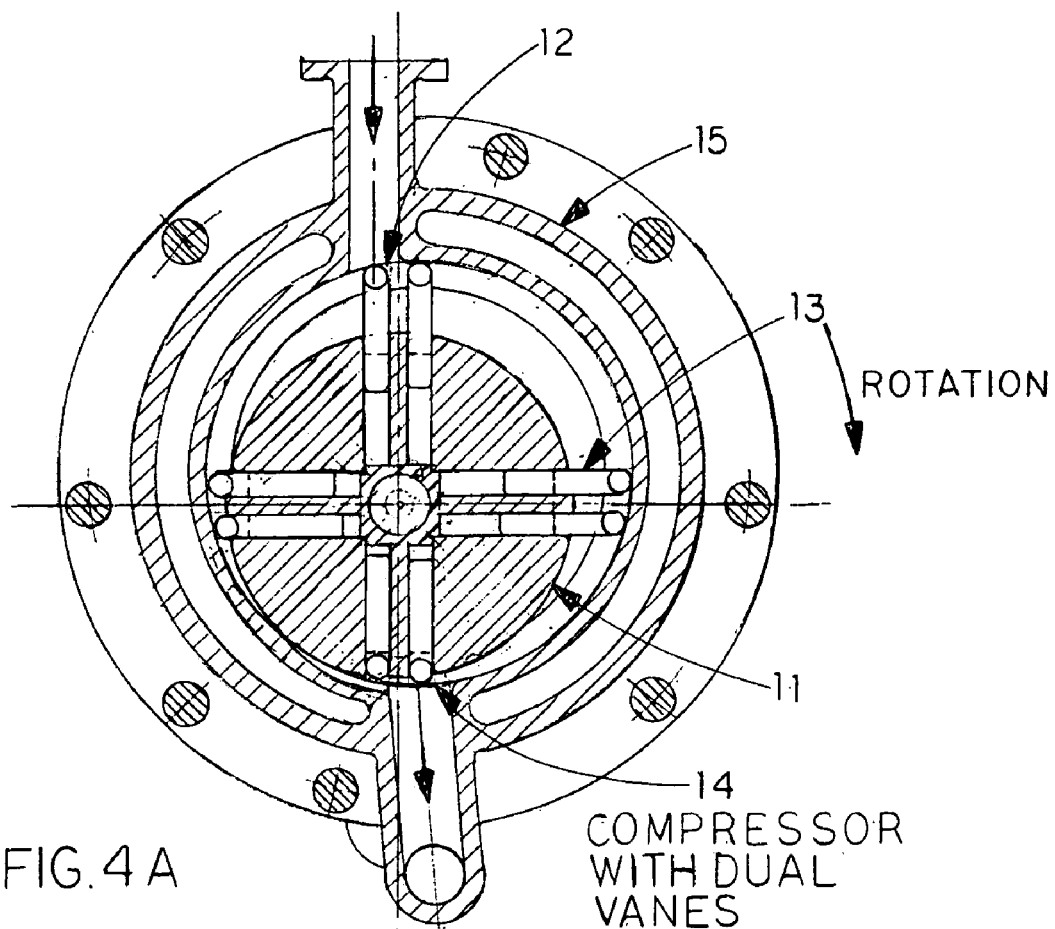
FIG. 4A — COMPRESSOR WITH DUAL VANES
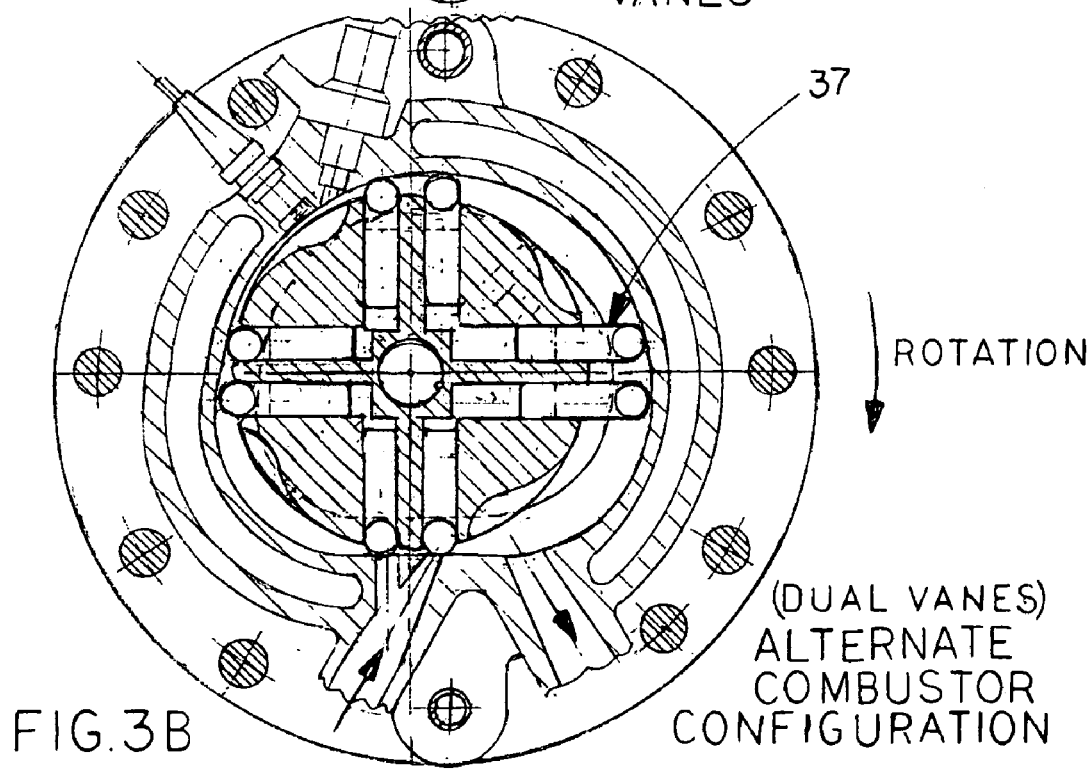
FIG. 3B — (DUAL VANES) ALTERNATE COMBUSTOR CONFIGURATION

ALTERNATE COMBUSTOR CONFIGURATION WITH DUAL VANES

AFTERBURNER

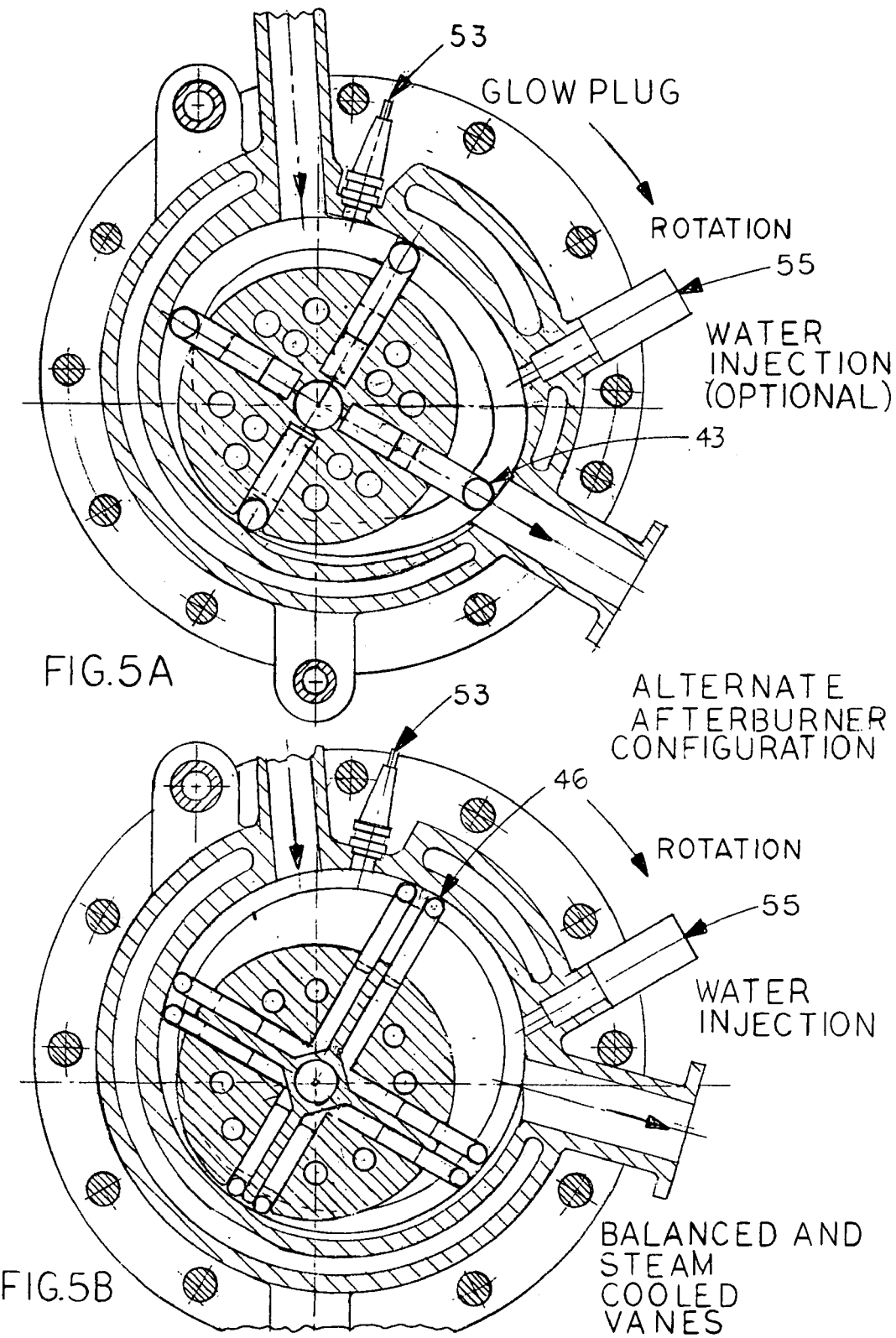

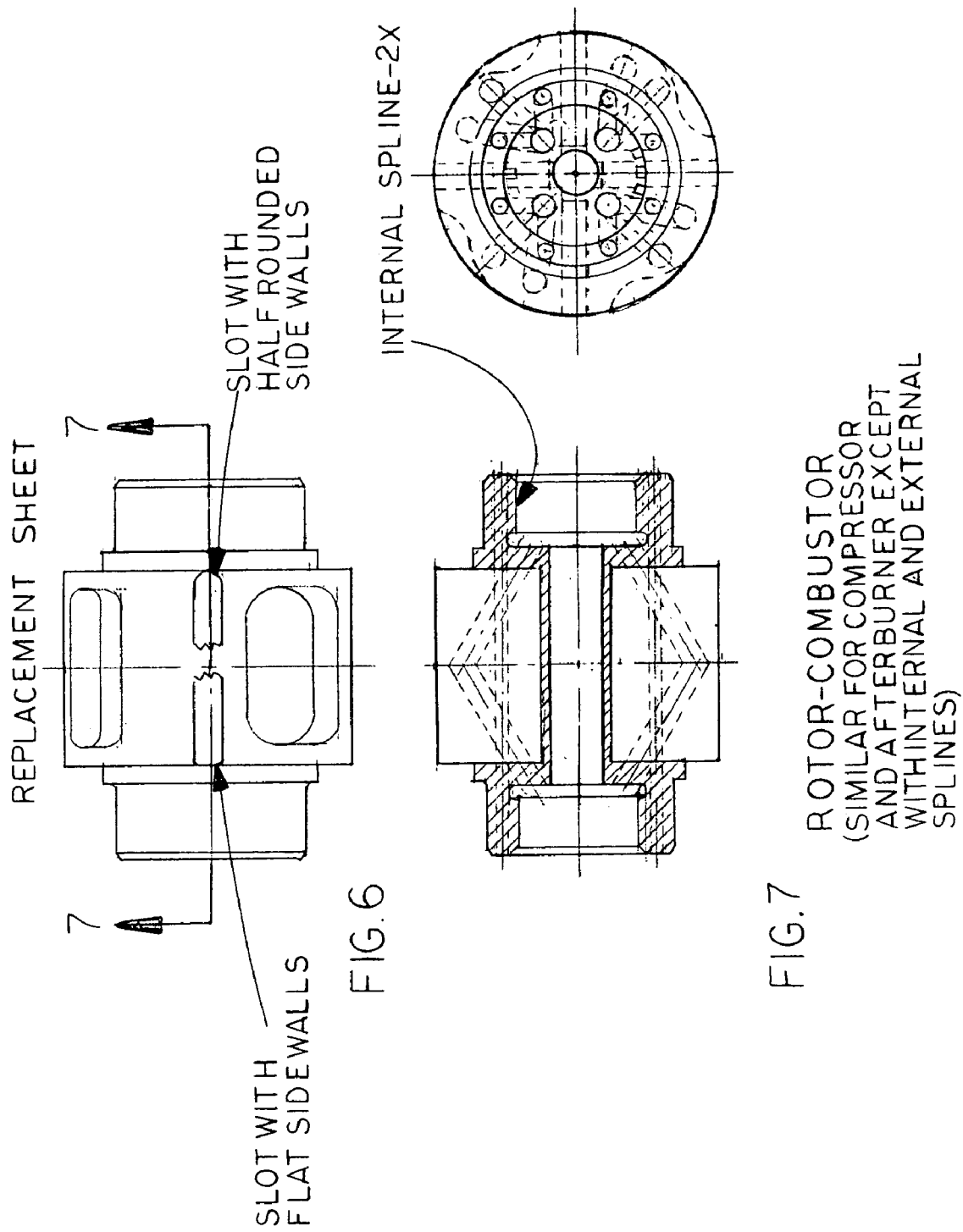

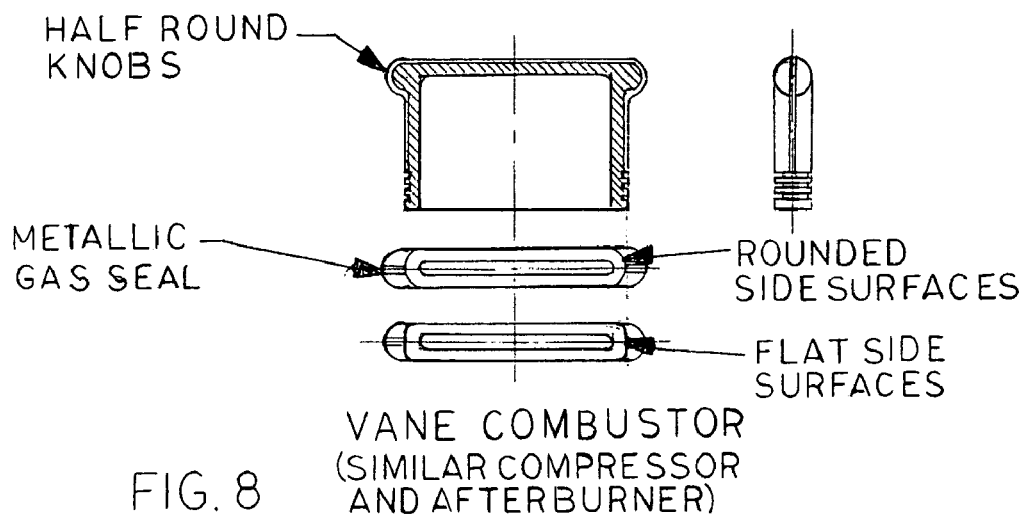
FIG. 8  VANE COMBUSTOR (SIMILAR COMPRESSOR AND AFTERBURNER)
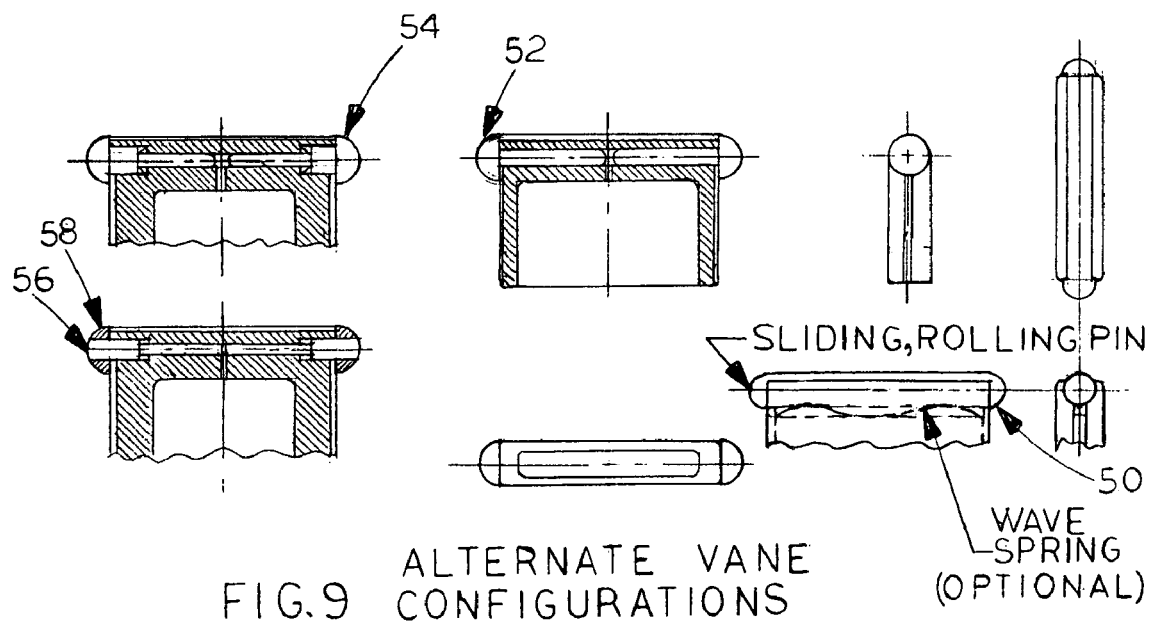
FIG. 9  ALTERNATE VANE CONFIGURATIONS

MULTI-STAGE MODULAR ROTARY INTERNAL COMBUSTION ENGINE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION–FIELD OF INVENTION

This invention relates to a Three-Stage Rotary Internal Combustion Engine of the Vane type, which includes a Compressor Unit, Combustor Unit and Afterburner Unit.

INTRODUCTION

A three-Stage Rotary Internal Combustion Engine used as a prime mover, is disclosed to have a Compressor Unit to feed compressed air to a Combustor Unit for further compression. The Combustor has a means of fuel injection and ignition at a high degree of compression. The Combustor's Rotor is driven by expansion of the combusted gases. An Aterburner Unit receives the combusted gases and scavenge air from the Combustor Unit for reburning, additional work and exhaust. Each Unit consists of a cylindrical Rotor that has a shaft on both ends. The Combustor Unit shaft is connected by means of splines on one end to the Compressor Unit shaft and on the other end to the Afterburner Unit shaft. The shaft and Rotors turn unidirectional and has output ends for continuously transmitting power. The spinning shaft of the cylindrical Rotor is mounted in an eccentric position within the interior of the Housing, and is supported by the carrying side-walls of the Housing.

Each Rotor accommodates multiple Vanes that reciprocate back and forth within the blind slots of the Rotor.

The Compressor, Combustor, and Afterburner Units are each provided with four single Vanes with gas seals (or four dual, but seal-less Vanes) to reduce leakage. The Vanes are provided with half-round knobs on opposite sides, aligned with their top-end surface. These half-round knobs fit, and slide in hemispherical grooves that act as a raceway on the interior side-walls of the Housing. The grooves follow the contour of the interior periphery of the Housing, enabling the Vanes to maintain contact with the interior walls, independent of gas pressure or Rotor speed. The Combustor Unit has four chambers to create power: an intake chamber, a compression chamber, an ignition and combustion chamber and an expansion and exhaust chamber. Each chamber is defined by the upstream and downstream sealing Vane, the interior carrying side-walls of the Housing, the interior peripheral wall of the Housing and the outside cylindrical surface of the Rotor. The Compressor and Afterburner have similarly four chambers. The Compressor, Combustor and Afterburner Units are assembled and secured by means of fasteners, while the Rotor shafts are interlinked by splines to form a common shaft turning the three Rotors unidirectional and at the same speed.

The Engine provides four cycles per revolution: the intake, the compression, the ignition and combustion, and the expansion and exhaust cycle. The Engine is adaptable to a variety of operating conditions and may be operated either as a Diesel System with high over-all volume ratio and compression ignition, or at a lower compression ratio with internal spark ignition and fuel injection for both systems.

BACKGROUND OF INVENTION

This invention relates to a Three-Stage Modular Rotary Internal Combustion Engine, which consists of a Compressor Unit, Combustor Unit and Afterburner Unit. Each Unit consists of a Housing with a bore and a cylindrical Rotor with a shaft that transfers the spinning motion of the Rotor. The Rotor shafts are mounted in an eccentric position in the bore and are supported by the carrying side-walls of the Housing. The Rotor has four single or four dual radial blind slots, spaced ninety degrees apart, wherein four single or four dual slidable and movable Vanes are inserted. The Vanes are outfitted with half round knobs on opposite sides, aligned with their top surface, which fit in the hemispherical grooves in the side-walls of the Housing. In the basic configuration, the Compressor, Combustor, and the Afterburner Units each have four Vanes provided with a metallic contoured gas seal installed along the surfaces of their sides and their top surface. However, when a rolling pin configuration is used only the side surfaces of the Vanes are sealed. For the dual Vane construction, the Compressor, Combustor, and Afterburner Units each have eight Vanes; no gas seals are needed.

The Rotary Engine with Vanes has many variations. This invention is directed to a Rotary Vane Engine with an eccentric Rotor, that accommodates four single or four dual Vanes spaced ninety degrees apart. The main features are as follows:

The Housing has a cylindrical bore, or any smooth curvilinear shape, free of abrupt bumps, thus avoiding seal shock, wear and chatter marks on the bore surfaces. A cylindrical Rotor is mounted in an eccentric position with respect to the Housing's bore and is supported by the carrying side-walls of the Housing. A hemispherical concentric groove, aligned with the interior Housing peripheral wall, is provided on the two opposing side-walls. The grooves act as a guiding track for the Vanes, by capturing their half-round knobs. The cylindrical Rotors are provided with radial blind slots that allow the Vanes to reciprocate back and forth there in, when the Rotor makes its spinning motion.

The slidable and movable Vanes, guided and suspended in the grooves of the side-walls, are in continuous contact with the interior Housing periphery and do not require the use of springs, cams or any other aids.

The power output is realized by the expanding gas in the Combustor acting on the extended Vanes that slide around the periphery of the Housing's bore, resulting in Rotor torque. The four combustion processes per revolution, result in a reduced differential pressure between the Compression, Combustion, and the Expansion chambers, therefore a high sealing requirement between the Vanes, the Housing side-walls and the peripheral wall of the bore is not required, which reduces friction.

Although, the Rotary Vane Engine has not been widely used due to some technical deficiencies, the approach provided in this Engine Design will result in a simple, easily manufactured, reliable, efficient and clean burning Internal Combustion Engine.

SUMMARY OF THE INVENTION

It is the primary objective of this invention to provide a Multi-Stage Modular Rotary Internal Combustion Engine of the Vane type, that is simple in construction, robust in design, easy to manufacture, reliable in operation, has a high power output, compact size and is clean burning with reduced harmful emissions. Another object of the present invention is to provide water cooling of the Housing Modules and oil cooling and lubrication of moving parts. The objects of this invention are realized by the following the technical solutions. According to the invention a Multi-Stage Rotary Internal Combustion Engine with permanently guided Vanes is presented. It consists of a Compressor Unit providing scavenge and super charged air, a Combustor Unit that incorporates a compressing portion, a working ignition and expansion portion, an Afterburner Unit comprising an expansion and exhaust portion, an ignition system, and a cooling system.

A. The working portion comprises at least a Compressor Unit, a Combustor Unit and an Afterburner Unit. An output Rotor shaft consists of a Combustor Rotor shaft linked with splines to, and driving a Compressor Rotor shaft. An Afterburner Rotor shaft is linked by splines to the Combustor shaft. Each Rotor has four single, or four dual radial blind slots, spaced ninety degrees apart. Four single or four dual Vanes are inserted in the Compressor, Combustor and Afterburner Rotor slots.

The Vanes that reciprocate back and forth in the cylindrical Rotor's radial blind slots, are provided with half round knobs at opposite sides at the top, aligned with the top surface, and are guided and suspended in the hemispherical grooves in both interior side-walls of the Housing. This configuration reduces bending stresses and friction between the Vanes and the Rotor slots. The Rotor shafts are provided with a hollow core to allow oil flow for cooling and lubrication.

B. The Compressor entity consists of the Housing with a cylindrical bore (or any other smoothly curvilinear shaped bore), and a cylindrical Rotor with a splined hollow core shaft, which is mounted in an eccentric position within the Housing and supported by the interior carrying side-walls. The Rotor has four single, or four dual radial blind slots, spaced ninety degrees apart, in which the Vanes are inserted. The Vanes are provided with half round knobs on opposite sides at the top, aligned with the top surface, and are guided and suspended in the hemispherical grooves in both interior side-walls of the Housing. The Rotor rotates about its axis, the Vanes reciprocate back and forth in the blind slots as the rotor rotates, thus forming induction and compression chambers within the Housing interior side-walls, the interior periphery and the outside surface of the cylindrical Rotor. An inlet port through the Housing's peripheral wall is provided on the upstream side in the induction chamber. An outlet port in the compressing portion of the chamber is placed on the downstream side through the Housing's peripheral wall leading to the inlet port of the Combustor Unit.

C. The Combustor Unit, comprises a Housing with a cylindrical bore (or any other smoothly curvilinear shaped bore), a splined hollow core shaft with a cylindrical Rotor, placed in an eccentric position that is supported by the carrying side-walls of the Housing. The Rotor has four single, or four dual radial blind slots, spaced ninety degrees apart, in which four single, or four dual slidable and movable Vanes are inserted. The Vanes are provided with half round knobs on opposite sides at the top, aligned with the top surface, and are guided and suspended in the hemispherical grooves in both interior side-walls of the Housing. An inlet passage, linked to the Compressor, is installed through the peripheral wall of the Housing to allow the entrance of pre-compressed air for further compression, ignition, combustion and expansion. The expanded hot gases act on the extended Vanes resulting in Rotor torque, simultaneously driving the interlinked Rotors of the Compressor and Afterburner.

Two spark plugs and two fuel injectors needed for the ignition system of the engine are placed in the peripheral wall of the Combustor at the point of the highest compression. The combusted, and expanding gasses move the Vanes in the direction of the exhaust port, thus spinning the rotor and shaft. The compression stroke in the Combustor is equivalent to ninety degrees, the expansion stroke is one hundred and fifty degrees, adding to the efficiency of the Engine's operating cycle and increasing energy utilization. Scavenge air aides in expelling residual exhaust gases. An exhaust outlet port is located in the peripheral wall of the Housing in the working portion of the Combustor. The space is defined by the Housing's peripheral wall, the outside surface of the cylindrical Rotor, the upstream and the downstream Vanes and the interior side-walls of the Housing. The combusted and expanding gases move in the direction of the rotation to the outlet port and pass through the transfer line to the inlet port of the Afterburner.

D. The aforementioned Afterburner entity comprises a Housing with a cylindrical bore (or any other smoothly curvilinear shaped bore), a splined hollow core shaft with a cylindrical Rotor, placed in an eccentric position that is supported by the carrying side-walls of the Housing. The Rotor has four single or four dual radial blind slots, spaced ninety degrees apart, in which four single or four dual slidable and movable Vanes are inserted. The Vanes are provided with half round knobs on opposite sides at the top, aligned with the top surface, and are guided and suspended in the hemispherical grooves in both interior side-walls of the Housing. The hollow core in the center of the shaft allows oil flow for cooling and lubrication. The exhaust gases and scavenge air from the Combustor Unit enter the Afterburner through an inlet passage, located in the Housing's peripheral wall. Two Glow Plugs ignite fugitive hydrocarbons for afterburning.

The Glow Plugs are installed on the interior peripheral wall of the Housing, in a position adjacent to the upstream side in the direction of rotation of the working portion of the chamber. The peripheral wall of the Housing is provided with an outlet port to expel afterburning gases. An optional water injection system may be incorporated to achieve additional power, reduce exhaust pollution while cooling the Vanes on the Rotor. The operating volume formed by the Housing interior peripheral walls, the cylindrical Rotor's external surface, the Housing side walls and the upstream and downstream Vanes is greater than the corresponding volume of the working portion of the Compressor since the operating volume in the Afterburner consists of heated and expanded exhaust gases and scavenge air from the Combustor.

The present invention has the following advantages because of the features described above:

1. Since the Engine has three stages, a Compressor to supercharge the air for work and scavenge in the Combustor; a Combustor with a larger expansion than compression stroke; and an Afterburner to complete the lean burning process of the Combustor exhaust gases; it achieves improved utilization of energy.
2. Since the eccentric Rotors and shafts are supported on opposite sides by the carrying side-walls of the Housing and the Vanes are sliding and moving radially in slots of the Rotor and are guided and suspended at their top end in the hemispherical grooves of the interior side-walls of the Housing, resulting in a straight back and forth motion of the Vanes, bending and friction forces between Vanes and Rotor slots are eliminated.
3. Since the shafts of the eccentric Rotors have a hollow core and are interconnected by splines and communicate with each other, oil for lubrication and cooling is easily accommodated and reliability is increased.
4. Since during afterburning of the exhaust gases, gas leaks and blowbacks from the Combustor are collected in the Afterburner for re-burning by means of glow plugs, raising the exhaust gas temperature, water could be injected into the exhaust gases to achieve additional power for efficiency and to reduce exhaust pollutants.
5. Since for small Engines simplicity and weight are important, the Afterburner could be omitted, and a Glow plug could be placed in the exhaust channel of the Combustor, thereby reducing complexity and engine mass.

DESCRIPTION OF THE DRAWINGS

The present invention is illustrated with drawings of the preferred embodiment. Following is a brief description of the drawings:

FIG. 1 is an external configuration of an embodiment according to the invention.

FIG. 2 is a cross-sectional drawing of FIG. 1, exhibiting the combined Modules of Compressor, Combustor and Afterburner interconnected by splines for the Rotor shafts and secured by means of bolts and nuts for the center Split Housings and provided with metallic spring seals at the interfaces.

FIG. 3 is a cross-section of the Combustor with a cylindrical bore and four single Vanes. Oil for cooling and lubrication flows through the hollow core of the Rotor and shaft.

FIG. 3A is a cross-section of the Combustor partly oval with a flat surface at the bottom side to minimize exhaust gases entering the compression chamber. The cylinder bore can be any smooth curvilinear shape to achieve the desired results.

FIG. 3B is a cross-section of an egg shaped Combustor with four dual Vanes, without gas seals.

FIG. 4 is a cross-section of the Compressor with a cylindrical bore and four single Vanes.

FIG. 4A is a cross section of the Compressor with a cylindrical bore and four dual Vanes.

FIG. 5A is a cross section of the Afterburner with a semi-elliptical shaped bore.

FIG. 5B is a cross-section of the Afterburner construction with four dual Vanes.

FIG. 6 and FIG. 7 are a typical view and cross-section of the Combustor cylindrical Rotor, and slots with rounded ends and flat sided surfaces. The construction of the cylindrical Rotors of the Combustor, Afterburner and Compressor are identical.

FIG. 8 is a one-piece configuration of a typical Vane with half-rounded knobs on opposite sides aligned with the top surface, flat side walls and half-rounded or flat end walls. A groove along the sides and top is provided for installing a two-piece contoured metallic gas seal.

FIG. 9 is a Vane configuration with separate knobs, and a single pin with spherical rounded ends, captured and free rolling at the top surface of the Vane.

DESCRIPTION OF THE EMBODIMENT

Figure 2A:
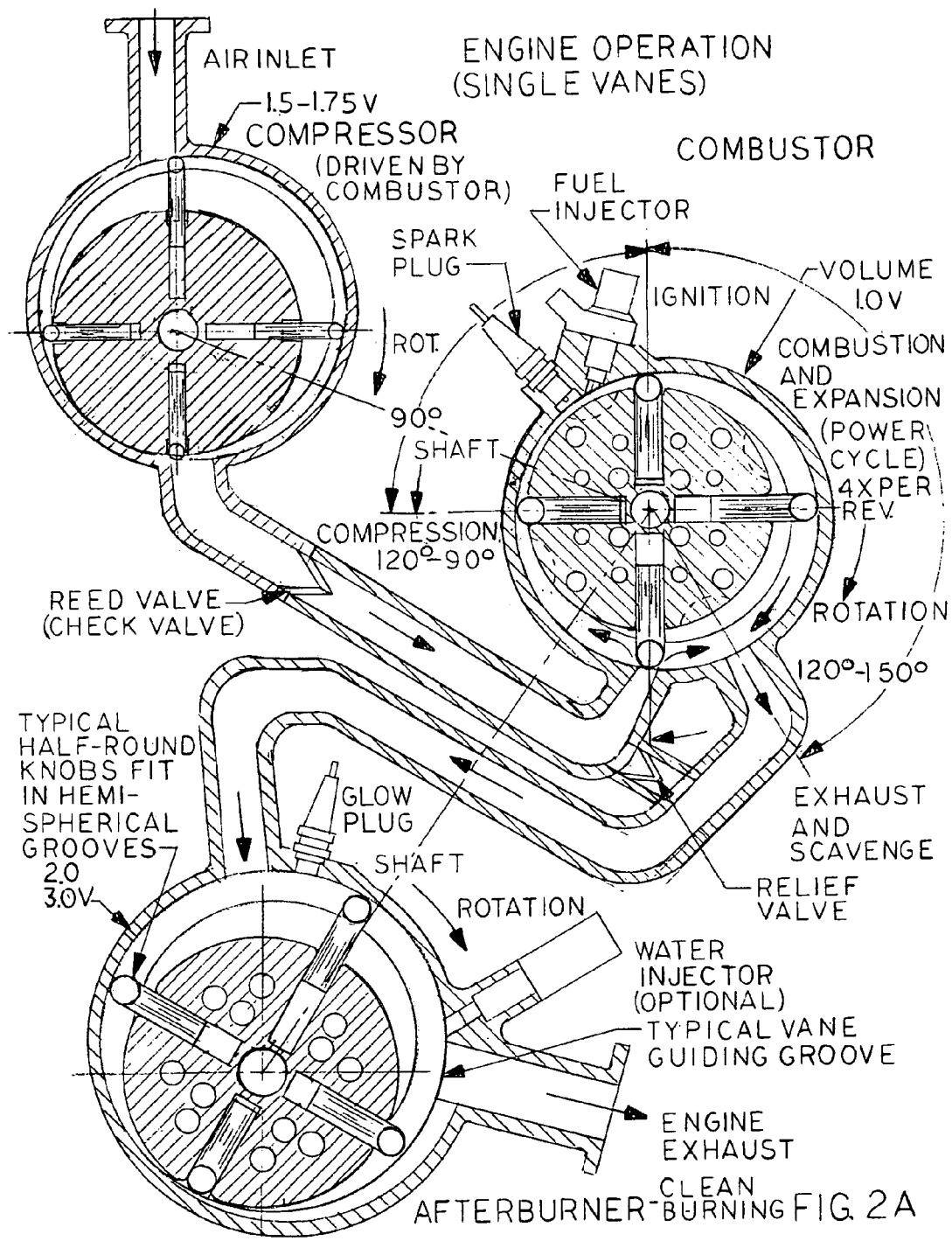
FIG. 2A is a schematic, showing the working procedure of the embodiment of this invention, and the sequence of operation of the Compressor, Combustor and Afterburner Units, including Vane positions with regard to the inlet port, gas transfer and exhaust gas port locations.
Figure 2B:
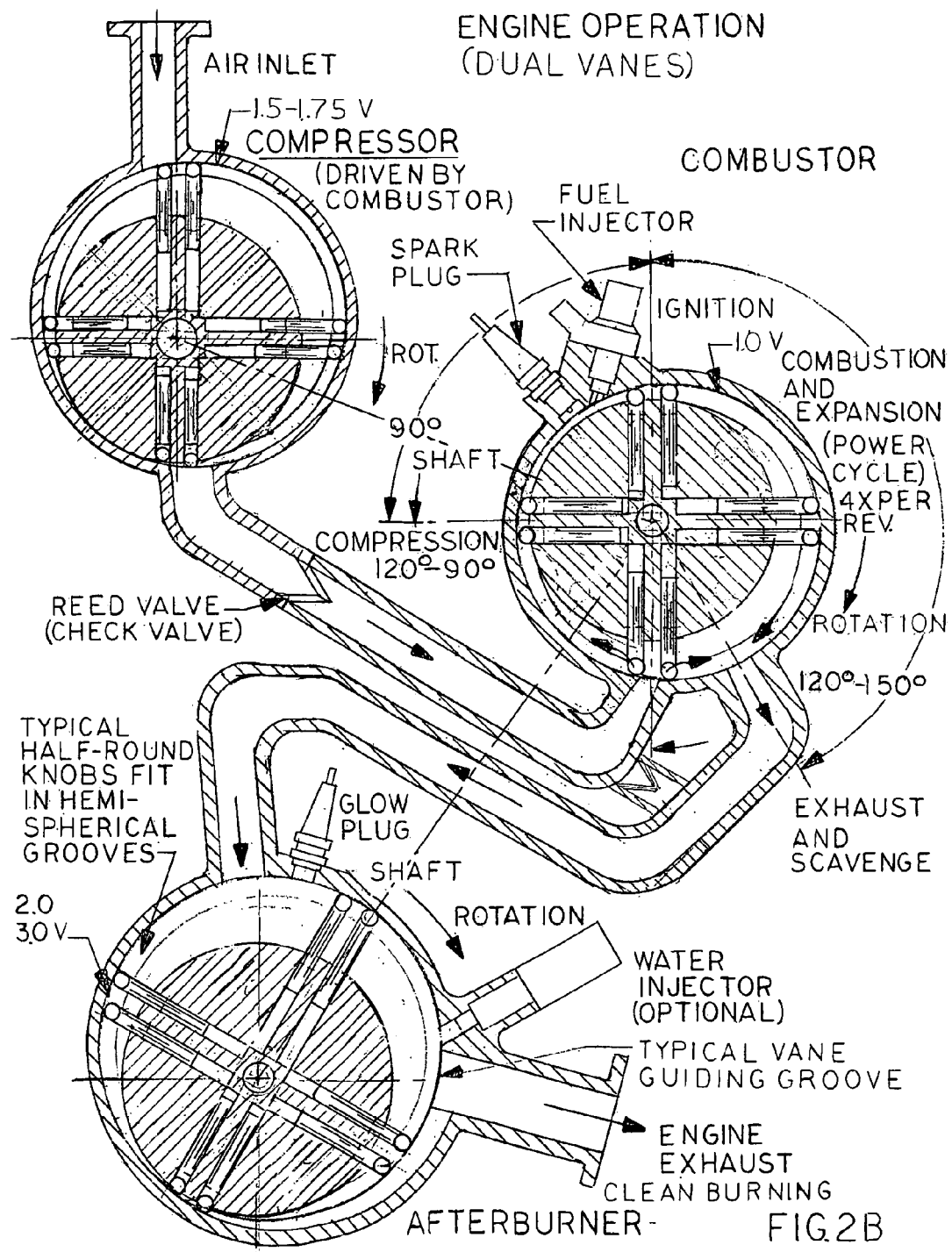
FIG. 2B is similar to FIG. 2A, but shows a dual Vane configuration.

The Multi-Stage Modular Rotary Internal Combustion Engine as exhibited in FIG. 1 and FIG. 2 comprises a Compressor Unit, a Combustor Unit and an Afterburner Unit combined and secured by means of bolts and nuts to form one assembled module. Several modules could be combined in series or in a parallel configuration.

For the sake of illustrating the invention clearly, external apparatus such as fuel injection and ignition system, water cooling radiator and pump, oil lubrication pump system, starting system and external piping are all omitted.

The primary objective of this invention is to illustrate the operation of the embodiment of this Multi-Stage Modular Rotary Internal Combustion Vane Engine system, which is different from patented rotary engine systems.

With reference to FIG. 2, FIG. 4 and FIG. 4A: The Compressor Unit comprises a hollow core shaft with splines on opposite ends. A cylindrical Rotor 11, provided with radial blind slots, in which slidable and movable single Vanes (shown in FIG. 4), or dual Vanes (shown in FIG. 4A), outfitted with half round knobs on opposite sides, aligned with the top surface of the Vanes, are inserted. FIG. 8 and FIG. 9 show various Vane configurations.

The Rotor, with the Vanes inserted in the slots, is assembled in a cylindrical Housing 15 and 17 with the Rotor shaft mounted in an eccentric position within the housing's interior, and supported by the carrying walls of the Housing 15 and 17. The Vanes' knobs are engaged in the hemispherical grooves of the interior side-walls of the Housing 15 and 17.

The Housing Halves 15 and 17 are secured by bolts 19 and nuts 9 while at the interface a circular spring-loaded metallic face seal 8 is clamped to ascertain a leak proof and structurally sound connection.

However, it is not required to have a Housing consisting of two identical halves. One part of the Housing could be the bore while the other part of the Housing could be a cover: as long as the hemispherical grooves are provided on opposite sidewalls to retain the Vanes' half-rounded knobs.

The Rotor shafts, which are in an eccentric position within the interior of the Housing and supported by the interior carrying walls of the Housing, are provided with semi-metallic and nylon seals 21 to prevent gas leakage into the oil stream. A combination of "O" rings and nylon cap seals prevents external oil leakage, however dual sealing on both sides of the shaft can be incorporated. The Shaft's hollow core hole transports oil for lubrication and cooling. The Housings are provided with water coolant jackets, the fluid flow direction is from the Compressor towards the Afterburner, shown in FIG. 2. The Housing internal periphery walls shown in FIG. 4 are provided with a port 12 for air induction and compressed air expulsion through a port 14 for admission into the Combustor.

Figure 3C:
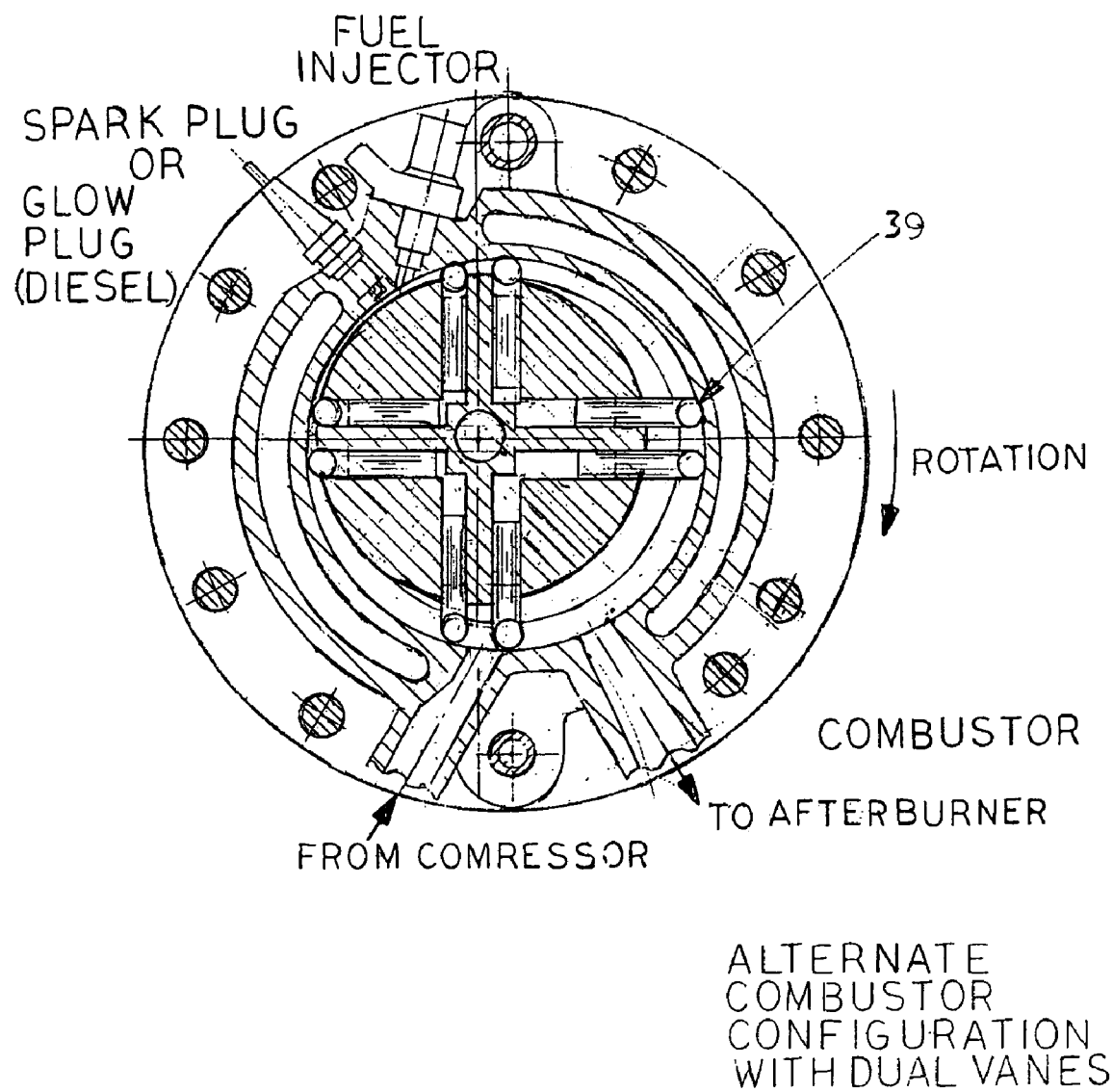
FIG. 3C is a cross-section of a cylindrical Combustor with four dual Vanes without gas seals.

The Combustor shown in FIG. 2 and FIG. 3 comprises a Rotor 25 mounted in eccentric position within the interior of the Housing, and the rotor shaft supported by the two interior carrying walls of the Housing 15 and 29. The Rotor has radial slots and slidable and movable single Vanes 27, or dual Vanes 37 (FIG. 3B) and 39 (FIG. 3C) with half round knobs at opposite sides, aligned with the top surface, and are guided in the hemispherical grooves in the interior sidewalls of the Housing 15 and 29. Semi-metallic and Nylon cap seals 31 are provided on both sides of the Rotor shaft to prevent hot gas leakage into the oil cavity. The housings 15 and 29 are also provided with water cooling jacket, while the Housings are secured by bolts 19 and nuts 9, to provide a strong and rigid connection.

At the Housing's interface a circular spring-loaded metallic seal 7 is installed and clamped to prevent hot gas leakage.

As explained previously, the same construction approach as the Compressor with a full bore Housing and cover can be applied, while on the interior Housing wall periphery spark plugs 49 and fuel injectors 51 are installed. Shown in FIG. 1, FIG. 3, FIG. 3A, FIG. 3B and FIG. 3C. The interior peripheral walls of the Housing 15 and 29 are provided with a gas outlet port 16 to expel the exhaust gas and an inlet port 18 to introduce fresh pre-compressed air from the Compressor for scavenge, combustion and work. Shown in FIG. 3.

The Vanes are provided with flat metallic contoured seals 33 to prevent high-pressure hot gas leakage between the chambers. The drilled holes 20 and 22 are additional cooling holes for the Rotor, while lubrication holes for the Vanes and Rotor is provided by drilled holes 24, 26, 28 and 30. Shown in FIG. 2.

Although a circular bore for the Housings internal periphery is the simplest design, a specially contoured configuration as shown in FIG. 3A is also feasible to minimize exhaust gases entering the compression chamber.

A different configuration of the Rotor as shown in FIG. 3B, comprising a cylindrical Rotor with dual Vanes, and a contoured Housing similar to FIG. 3A.

A construction with dual Vanes is shown in FIG. 3B and FIG. 3C. The advantage is that no gas seals for the Vanes 37 and 39 are required.

Figure 5:
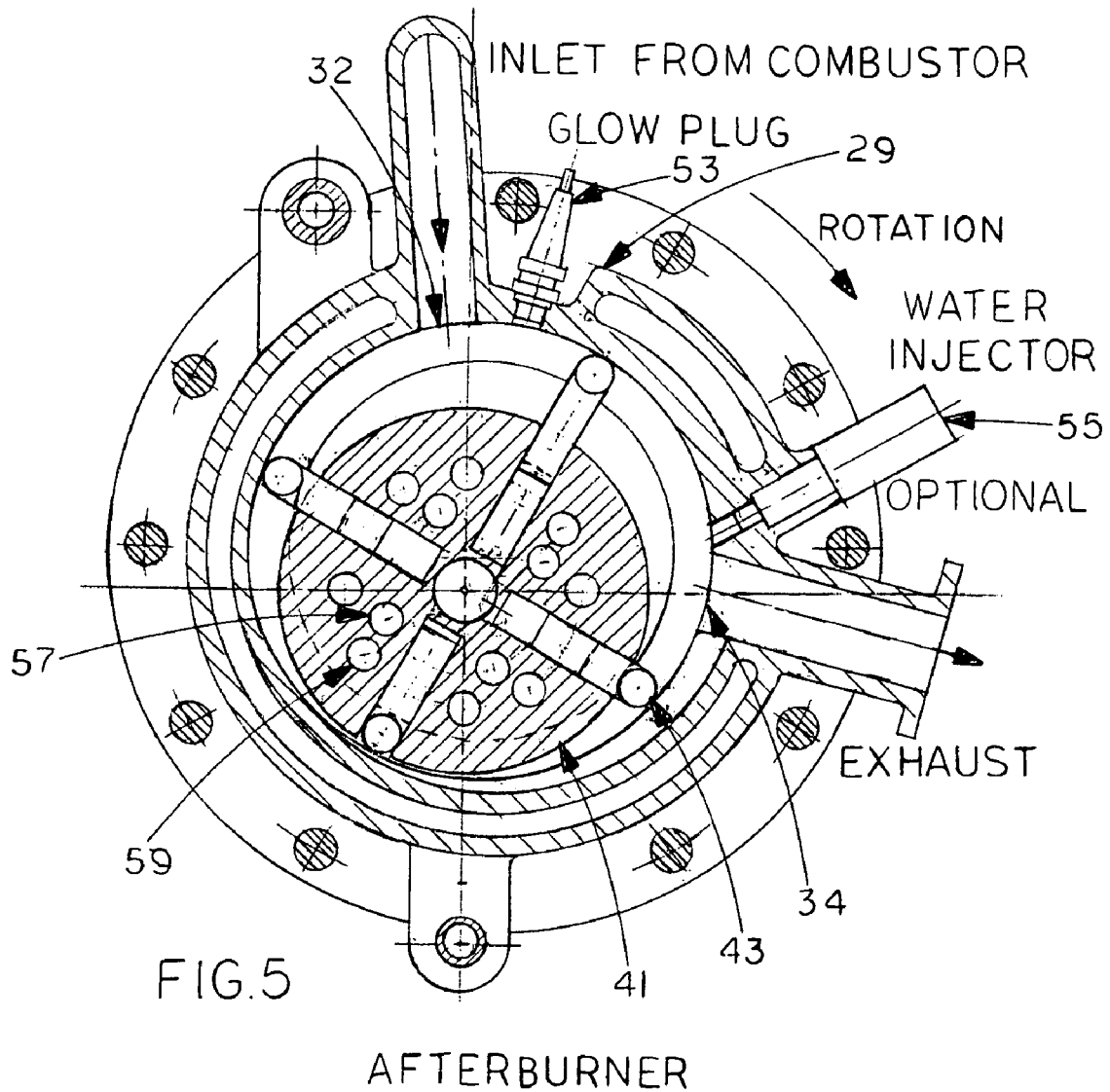
FIG. 5 is a cross-section of the Afterburner with a cylindrical bore and four single Vanes, with Glow plug and optional Water Injector.

In FIG. 2 and FIG. 5 a cross-section of the Afterburner Unit is shown. It comprises a cylindrical Rotor 41 with radial slots and a center hole for oil flow for lubrication and cooling. In the blind slots are inserted slidable and movable single Vanes 43 (FIG. 5A), or dual Vanes 46 (FIG. 5B), with half-round knobs on opposite sides, aligned with the top surface of the Vane, that are guided in the hemispherical grooves on both sides of the interior side-walls of the of the Housing 29 and 47. Semi-metallic and Nylon seals 48 are provided on both sides of the Rotor shaft to prevent hot gas from entering the oil cavities. Both Housings 29 and 47 are provided with water cooling jackets. At the interface joint a circular spring-loaded metallic seal 6 is installed. The Housings 29 and 47 are secured by means of bolts 19 and nuts 9 to provide a sturdy connection.

The cylindrical Rotor 41 is mounted in an eccentric position within the interior of the Housing of the Afterburner. The Rotor shafts are supported by opposite carrying sidewalls of the Housing 29 and 47, seals 23 are provided to prevent external oil leakage. The interior wall periphery include an inlet port 32 and exhaust port 34, shown in FIG. 5, to admit the partly cooled by scavenge air, combustion gases from the Combustor and to expel the lean re-burned gases to the atmosphere through exhaust the port 34.

Cooling holes 57 and 59, lubricating holes 36, 38, 40, and 42 are provided as shown in FIG. 2. In the interior peripheral wall of the Housing 29 and 47 Glow Plugs 53 and an optional Water Injector 55 are incorporated as shown in FIG. 5.

FIG. 5A shows a semi oval shaped Housing configuration to create additional power by extending the Vane prior to expelling the exhaust gases.

FIG. 5B shows a dual Vane configuration requiring no seals. The Vanes are cooled by an optional injection of a water spray into the hot gasses, resulting in steam exhaust.

FIG. 6 and FIG. 7 show a typical cylindrical Rotor of a Combustor or Afterburner, with flat or rounded slot side surfaces.

FIG. 8 shows a one-piece construction of a Combustor Vane, which could be used for an Afterburner and Compressor.

FIG. 9 shows a Vane configuration with a separate half-knob pin construction 52 and 54, while 58 and 56 is a half-rounded sleeve and pin construction. These designs will allow the Pins and Knobs to slide and spin independently of the Vane to reduce friction in the interior hemispherical side-wall grooves of the Housing.

Another configuration shows a Vane, FIG. 9, with a long Pin 50 with half-round knobs at both ends, clamped at the top of the vane that is free and free to roll and slide.

What is claimed is:

1. A multi-stage modular rotary vane-type internal combustion engine comprising:
    a compressor unit inspiring air intake, charging and compressing fresh air;
    a combustor unit receiving the compressed air from the compressor unit for scavenge and compression; and having a means for injecting fuel and igniting the highly compressed air resulting in the combustor rotor to be driven by the expansion of the combusted gases;
    an afterburner unit, receiving the combusted gasses and scavenged air from the combustor unit, and having glow plugs for further burning and expulsion of the lean exhaust gases;
        wherein each unit of the compressor, and combustor, and the afterburner further comprise:
    a housing with side-walls having hemispherical concentric grooves,
    vanes extending radially, said vanes are slidable and movable, and are outfitted with half-round knobs on opposite sides of the top surface and are aligned within the housing periphery;
    a cylindrical rotor, mounted in an eccentric position within the housing and supported by the housing's interior carrying walls, having a plurality of radial slots with half rounded or flat end walls;
        wherein said radially extending, slidable and movable vanes are inserted;
        wherein the housing's hemispherical concentric grooves capture and guide the half-round knobs of said vanes while riding on the inside curvature of the housing, to prevent the vanes from bending under the gas pressure; to maintain said vanes in a straight position within their respective slots, and to eliminate friction forces;

wherein side surfaces of said radially extending, slidable and movable vanes contact interior side-walls of the housing and a top surface of said radially extending, slidable and movable vanes is in permanent contact with the surface of the interior peripheral wall of the housing;

wherein a shaft of said each cylindrical rotor is provided with splines at both ends to connect to the rotor of the compressor, combustor and afterburner, and is provided with a hollow core to allow oil flow for cooling and lubrication.

2. The multi-stage modular rotary vane-type internal combustion engine of claim 1, wherein the housing and the radially extending, slidable and movable vanes, outfitted with half-round knobs and guided and supported in hemispherical grooves at the top end of the interior side-walls of the housing are also applied for hydraulic or pneumatic rotary motors and pumping devices.

* * * * *